United States Patent
Raghavan et al.

(10) Patent No.: US 10,282,437 B2
(45) Date of Patent: May 7, 2019

(54) PARTIAL INDEXES FOR PARTITIONED TABLES

(71) Applicant: Oracle International Corporation, Redwood Shores, CA (US)

(72) Inventors: Ananth Raghavan, San Francisco, CA (US); George Eadon, Hollis, NH (US); Ramesh Kumar, San Francisco, CA (US); Hermann Baer, San Mateo, CA (US); Suresh Sridharan, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 708 days.

(21) Appl. No.: 14/255,425

(22) Filed: Apr. 17, 2014

(65) Prior Publication Data

US 2015/0302035 A1     Oct. 22, 2015

(51) Int. Cl.
*G06F 17/30* (2006.01)

(52) U.S. Cl.
CPC .. *G06F 17/30321* (2013.01); *G06F 17/30312* (2013.01); *G06F 17/30336* (2013.01); *G06F 17/30584* (2013.01); *G06F 17/30613* (2013.01)

(58) Field of Classification Search
CPC ......... G06F 17/30613; G06F 17/30321; G06F 17/30312; G06F 17/30336; G06F 17/30483; G06F 17/30584
See application file for complete search history.

(56) References Cited

U.S. PATENT DOCUMENTS

| | | | | |
|---|---|---|---|---|
| 5,960,194 A | * | 9/1999 | Choy | .................... G06F 9/355 |
| 6,665,684 B2 | * | 12/2003 | Zait | .................... G06F 17/3033 |
| 7,047,250 B1 | * | 5/2006 | Agarwal | .......... G06F 17/30312 |
| 7,299,239 B1 | * | 11/2007 | Basu | ................ G06F 17/30587 |
| 7,987,164 B2 | * | 7/2011 | Hu | .................... G06F 17/30336 |
| | | | | 707/696 |
| 8,051,034 B2 | * | 11/2011 | Mehta | .............. G06F 17/30445 |
| | | | | 705/35 |

(Continued)

OTHER PUBLICATIONS

Praveen and Arun, "Generalized Partial Indexes", 1999.*

(Continued)

*Primary Examiner* — Merilyn P Nguyen
(74) *Attorney, Agent, or Firm* — Hickman Palermo Becker Bingham LLP; Daniel D. Ledesma

(57) ABSTRACT

Techniques for creating and using partial indexes are provided. A partial index is an index that indexes one or more partitions of a partitioned table and does not index one or more other partitions of the partitioned table. Thus, if a partition of a partitioned table is rarely used, then an index may index all other partitions of the partitioned table or at least only those partitions that are written to or read from relatively frequently. Also, in preparation for loading data into a partition, indexing for the partition may be "turned off", effectively making a full index a partial index. While the data is loaded into the partition, the partial index is still available for query processing. After the data is loaded into the partition, indexing for the partition is "turned on", which causes the data in the partition to be indexed by the partial index.

20 Claims, 4 Drawing Sheets

(56) References Cited

U.S. PATENT DOCUMENTS

| | | | | |
|---|---|---|---|---|
| 8,195,702 | B2* | 6/2012 | Shankar | G06F 17/30336 707/792 |
| 8,380,702 | B2* | 2/2013 | Baby | G06F 17/30911 707/715 |
| 8,965,899 | B1* | 2/2015 | Van Rotterdam | G06F 17/30442 707/741 |
| 9,460,186 | B2* | 10/2016 | Liu | G06F 17/30584 |
| 10,102,228 | B1* | 10/2018 | Huang | G06F 17/30289 |
| 2003/0115206 | A1* | 6/2003 | Gilbert | G06F 17/30339 |
| 2004/0148293 | A1* | 7/2004 | Croisettier | G06F 17/30336 |
| 2005/0027692 | A1* | 2/2005 | Shyam | G06F 17/30321 |
| 2005/0187897 | A1* | 8/2005 | Pawar | G06F 17/30339 |
| 2006/0085465 | A1* | 4/2006 | Nori | G06F 17/30297 |
| 2009/0063458 | A1* | 3/2009 | Beavin | G06F 17/30486 |
| 2009/0089334 | A1* | 4/2009 | Mohamed | G06F 17/30339 |
| 2009/0210443 | A1* | 8/2009 | Barbarek | G06F 17/30339 |
| 2010/0138442 | A1* | 6/2010 | Shinkawa | G06F 17/30923 707/769 |
| 2010/0161569 | A1* | 6/2010 | Schreter | G06F 17/30327 707/696 |
| 2010/0281013 | A1* | 11/2010 | Graefe | G06F 17/30327 707/715 |
| 2010/0281017 | A1* | 11/2010 | Hu | G06F 17/30477 707/718 |
| 2012/0047158 | A1* | 2/2012 | Lee | G06F 17/30469 707/759 |
| 2012/0124045 | A1* | 5/2012 | Pendap | G06F 17/30498 707/737 |
| 2012/0254174 | A1* | 10/2012 | Mitra | G06F 17/30091 707/737 |
| 2013/0238628 | A1* | 9/2013 | Behnen | G06F 17/30584 707/741 |
| 2013/0290703 | A1* | 10/2013 | Resch | H04L 67/1097 713/155 |
| 2015/0074150 | A1* | 3/2015 | Kapur | G06F 17/30584 707/803 |

OTHER PUBLICATIONS

Oracle Global Index vs. Local Index, "Oracle Tips by Burleson Consulting", dated May 14, 2010, http://www.dba-oracle.com/t_global_local_partitioned_index.htm, last viewed on Nov. 6, 2014, 4 pages.

Eugene Wu, Samuel Madden; "Partitioning Techniques for Fine-grained Indexing"; pp. 1127-1138; Published 2011; Publisher—IEEE Computer Society, Washington DC, USA.†

\* cited by examiner
† cited by third party

PARTIAL INDEXES FOR PARTITIONED TABLES

This application is related to U.S. application Ser. No. 14/603,741, filed Jan. 23, 2015, entitled "Image Advisor"; U.S. application Ser. No. 14/603,764, filed Jan. 23, 2015, entitled "Populating Content for a Base Version of an Image"; U.S. application Ser. No. 14/603,775, filed Jan. 23, 2015, entitled "Creation of a Software Configuration Signature for Software"; U.S. application Ser. No. 14/603,532, filed Jan. 23, 2015, entitled "Version Management of Images"; and Provisional Appln. 62/056,412, filed Sep. 26, 2014, the entire contents for each of which is hereby incorporated by reference as if fully set forth herein.

FIELD OF THE DISCLOSURE

The present disclosure relates to indexing and, more particularly to, indexing a sub-portion of a partitioned table.

BACKGROUND

In typical database systems, users store, update, and retrieve information by interacting with user applications ("clients"). The clients respond to the user's interaction by submitting commands to a database application responsible for maintaining the database (a "database server"). The database server responds to the commands by performing the specified actions on the database. To be correctly processed, the commands must comply with the database language that is supported by the database server. One popular database language is known as Structured Query Language (SQL).

Various access methods may be used to retrieve data from a database. The access methods used to retrieve data may significantly affect the speed of the retrieval and the amount of resources consumed during the retrieval process. Many access methods use indices to increase the speed of the data retrieval process. Typical database management systems support a number of different types of access methods, such as access methods that use B+Trees and Hash Tables, that may be used when the key values belong to standard sets of data types, such as numbers, strings, etc.

One drawback to indexes is that indexes occupy considerable space. To compound the problem, it is common that a table in a database has multiple indexes defined for that table.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
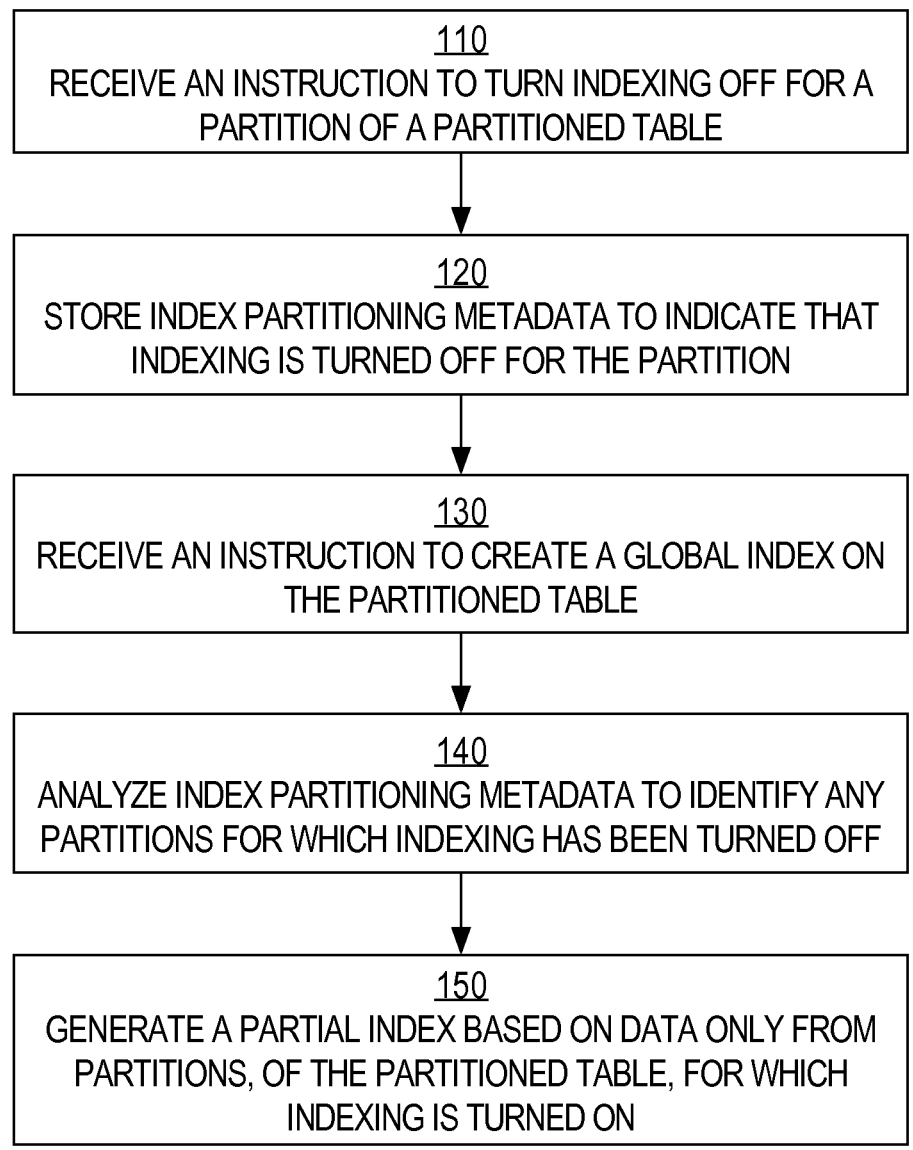
FIG. 1 is a block diagram that depicts a process for creating a partial index, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Global Index V. Local Index

A "full index" is an index that indexes all partitions of a table. A full index may or may not be partitioned. A full index may be a global index or a local index. The structure of a global index has no correlation with the partitioning of the corresponding table. In contrast, a local index has a one-to-one correspondence with the partitions of a table. If the global index is partitioned, then the one or more partitioning criteria used to partition the global index is different than the one or more partitioning criteria used to partition the table. A partition of a global index contains data from all partitions of a table.

A table may be associated with one or more global indexes and/or one or more local indexes. For example, a partition of a table may be indexed by a local index and a global index. As another example, a partition of a table may not be indexed by any local index but rather only by a global index.

General Overview

Techniques are provided for creating and maintaining a partial index. A "partial index" is a global index or a local index that indexes at least one partition and up to all partitions of a partitioned table, depending on the indexing status of a partition. Hereinafter, a partial index may index all partitions of a partitioned table while a full index always indexes all partitions of a partitioned table. A partial index may be created at the time when an instruction to create an index based on a partitioned table is received. Alternatively, an index originally may be covering N partitions at creation time and later become an index covering M partitions after one or more partitions of the partitioned table are designated as not indexable (or indexable) with respect to the index.

Thus, a user is able to create an index that indexes a subset of the partitions of a partitioned table and exclude one or more other partitions of the partitioned table from being indexed. Therefore, metadata, for one or more indexes, may indicate simultaneously that one or more partitions of a partitioned table are to be indexed and one or more other partitions of the partitioned table are not be indexed.

Once a partial index is created, a query execution engine that processes queries that use the partial index may determine which partitions are not indexed by the partial index and using multiple access paths to the relevant data.

Partition Metadata

A partitioned table is associated with metadata that indicates information about one or more partitions in the partitioned table. Example metadata includes, on a table basis, partitioning criteria that indicates how the table is partitioned and, on a per-partition basis, what is stored in the corresponding partition. For example, if a table is partitioned using list partitioning, then metadata for a partition identifies one or more values that column values must satisfy (e.g., match) in order to belong to that partition.

In an embodiment, metadata for a table partition indicates whether the partition is indexed. Such metadata is referred to herein as "index partitioning metadata." Index partitioning metadata (or IPM) may be maintained at the partition level (e.g., a different set of index partitioning metadata for each partition) or at the table level where the IPM includes information about multiple partitions. As described in more detail below, IPM may be index specific in that one portion of the IPM may only applicable to one index while another portion of the IPM may only be applicable to another index.

IPM may indicate that indexing is "turned off" with respect to a particular table partition. Alternatively, IPM for a particular table partition may specify that indexing is "turned on." If IPM for a particular partition does not specify whether indexing is turned on or off, then a default indication is that indexing is considered "turned on" (or allowable) for that particular partition.

In an embodiment, partitioning attributes from a higher level object (e.g., a table or a partition) are inherited by a lower level object (e.g., a partition or subpartition). For example, a indexing for a particular partition may be specified as "off". As a result, indexing for any existing subpartitions of the particular partition is turned off and/or indexing for future subpartitions of the particular partition is turned off.

In an embodiment, an index is associated with index metadata that indicates whether the index is a full index or a partial index. If the index is a full index, then index partitioning metadata that indicates that a partition that is indexed by the full index is turned off may be ignored.

Partial Index Creation

In an embodiment, a partial index is created in response to an instruction (e.g., a database statement) that requests creation of an index. Thus, the partial index is not created from a full index. An example SQL statement is the following:
  CREATE INDEX emp_ename ON emp(ename) PARTIAL;
where an index entitled 'emp_name' is created based on the column 'ename' of table 'emp.' The statement includes an explicit instruction ("PARTIAL") to create a partial index. If ename is a partitioned table and indexing is "turned off" (as reflected in IPM for the partitioned table) for one or more partitions of the partitioned table, then processing of the example database statement will result in creation of index 'emp_ename' as a partial index. The IPM for the table 'env' is analyzed to determine which table partition(s) have indexing turned off. For example, if 'env' comprises ten partitions, P1-P10, and IPM for 'env' indicates that indexing is turned off for partitions P2 and P8, then partial index 'emp_ename' indexes data from partitions P1, P3-P7, P9, and P10, and not from partition P2 or partition P8.

FIG. 1 is a block diagram that depicts a process 100 for creating a partial index, in an embodiment. Process 100 may be implemented by a database server in a database management system.

At block 110, an instruction to turn indexing off with respect to a partition is received. An example instruction is the following:

```
CREATE TABLE orders (
    ID      int,
    Date    date,
    Name    varchar(255)
)
PARTITION BY RANGE (Date) (
    PARTITION orders_q1_2013 VALUES LESS THAN
    (TO_DATE('01-APR-
    2013','dd-MON-yyyy')) INDEXING OFF,
    PARTITION orders_q2_2013 VALUES LESS THAN
    (TO_DATE('01-JUL-
    2013','dd-MON-yyyy')) INDEXING ON,
    PARTITION orders_q3_2013 VALUES LESS THAN
    (TO_DATE('01-OCT-
    2013','dd-MON-yyyy')) INDEXING ON,
    PARTITION orders_q4_2013 VALUES LESS THAN
    (TO_DATE('01-JAN-
    2014','dd-MON-yyyy')) INDEXING ON
);
``` where indexing is turned off with respect to partition 'orders_q1_2013'.

Another example instruction may be one that is received and processed after a partitioned table has been created and the instruction specifies one of the partitions to turn indexing off.

At block 120, in response to receiving the instruction, index partitioning metadata is stored that indicates that the indexing is turned off for the partition.

At block 130, an instruction to create an index on the partitioned table that includes the partition is received.

At block 140, in response to receiving the instruction, index partitioning metadata is analyzed to identify any partitions for which indexing has been turned off.

At block 150, a partial index is generated based on only data from partitions of the partitioned table for which indexing is turned on.

Figure 2:
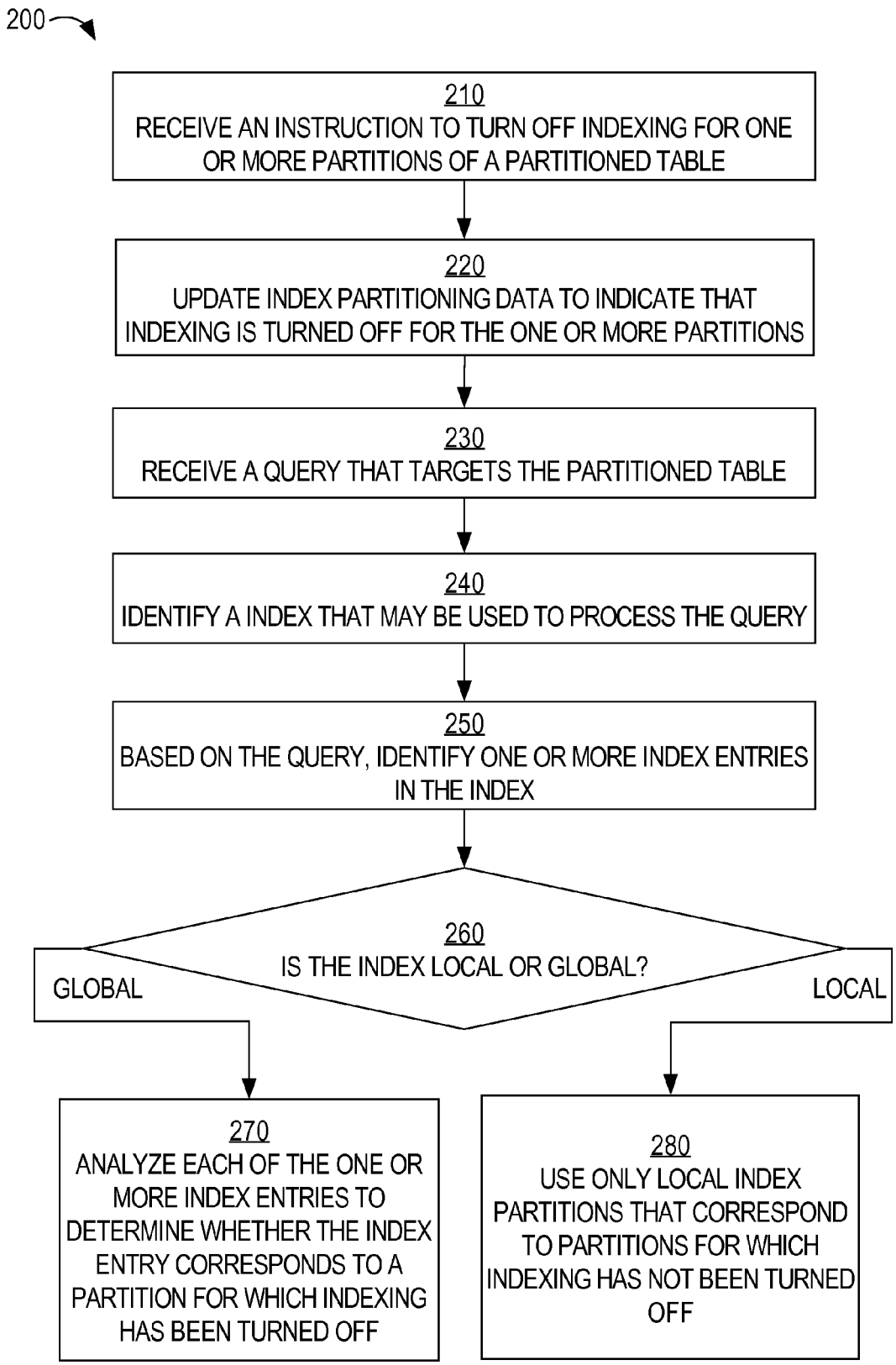
FIG. 2 is a block diagram that depicts a process for generating a partial index after a full index has already been created, in an embodiment.

FIG. 2 is a block diagram that depicts a process 200 for modifying a partial index after the index has already been created, in an embodiment. For example, a partitioned table comprises partitions P1-P5 and the index is based on a column of the partitioned table and indexes all partitions.

At block 210, an instruction to turn off indexing for one or more partitions of a partitioned table is received. An example instruction is the following database statement:
  ALTER TABLE orders MODIFY PARTITION ord_p3 INDEXING OFF;
where the partitioned table is 'orders' and one of the partitions is named 'ord_p3'.

In an embodiment, a full index is one that always indexes all partitions of a partitioned table and cannot be a partial index unless other metadata associated with the full index is modified. Thus, if the other metadata indicates that an index is full and the instruction in block 210 is received, then the instruction is ignored for the full index and only applied to partial indexes.

At block 220, index partitioning metadata is updated to indicate that indexing is turned off for the one or more partitions. Block 220 may involve marking local index partitions unusable (equivalent to "dropping" the local index partitions) for the table partitions for which indexing is turned off.

At block 230, a query that targets the partitioned table is received. Example query languages to which the query may conform include SQL, SQL/XML, and XQuery.

At block 240, an index (whether global or local) that may be used to process the query is identified. Block 240 may involve a query processor determining that a particular execution plan that involves the index is the least cost execution plan among multiple candidate execution plans.

At block 250, the index is used to identify, based on one or more search criteria (e.g., name='Smith') indicated in the query, one or more index entries.

At block 260, it is determined whether the index is a global index or a local index. Block 260 may be performed before block 250 or after block 250.

At block 270, for global indexes, each identified index entry is analyzed to determine whether the index entry belongs to or corresponds to a partition for which indexing has been turned off. Such index entries are referred to herein as "orphaned entries." Block 260 may involve identifying an object number indicated in the index entry and comparing the object number against a list of one or more object numbers that identify partitions for which indexing has been turned off. The list may be part of the index partitioning metadata. Alternatively, the list may be stored in association with the partial index (e.g., in metadata for the global index), but separate from the index partitioning metadata (which may be stored at the table level or partition level). Each identified index entry that is an orphaned entry is ignored when determining results of the query results retrieved from the index. Because data from partitions with indexing off cannot be retrieved from the global index, a scan of the corresponding table partitions is performed and combined with the results retrieved from the partial global index.

At block 280, for local indexes, only usable local index partitions that correspond to table partitions for which indexing has not been turned off are used. Local index partitions that correspond to table partitions for which indexing is turned off are unusable, which is equivalent to non-existent. Because such local index partitions are not available for data retrieval, a scan of the corresponding table partitions is performed and combined with the results retrieved from the usable local index partitions.

In an alternative embodiment, instead of storing a list of partitions for which indexing has been turned off and creating orphaned entries, index entries that correspond to a partition for which indexing has been turned off are deleted. Thus, each global index that indexes one of the one or more partitions for which indexing is turned off is scanned to identify index entries that correspond to one of those partitions. The identified index entries are deleted. After the appropriate index entries are deleted, the global index(es) do not contain any orphaned entries anymore. No further data maintenance or rebuild of the global index(es) is required.

One advantage that updating metadata associated with a global index to identify a partition (for which indexing has just been turned off) has over deleting multiple index entries is that updating metadata requires significantly less time and computer resources than are required for scanning an entire global index looking for entries to delete.

Use Case: Loading Data

Figure 3:
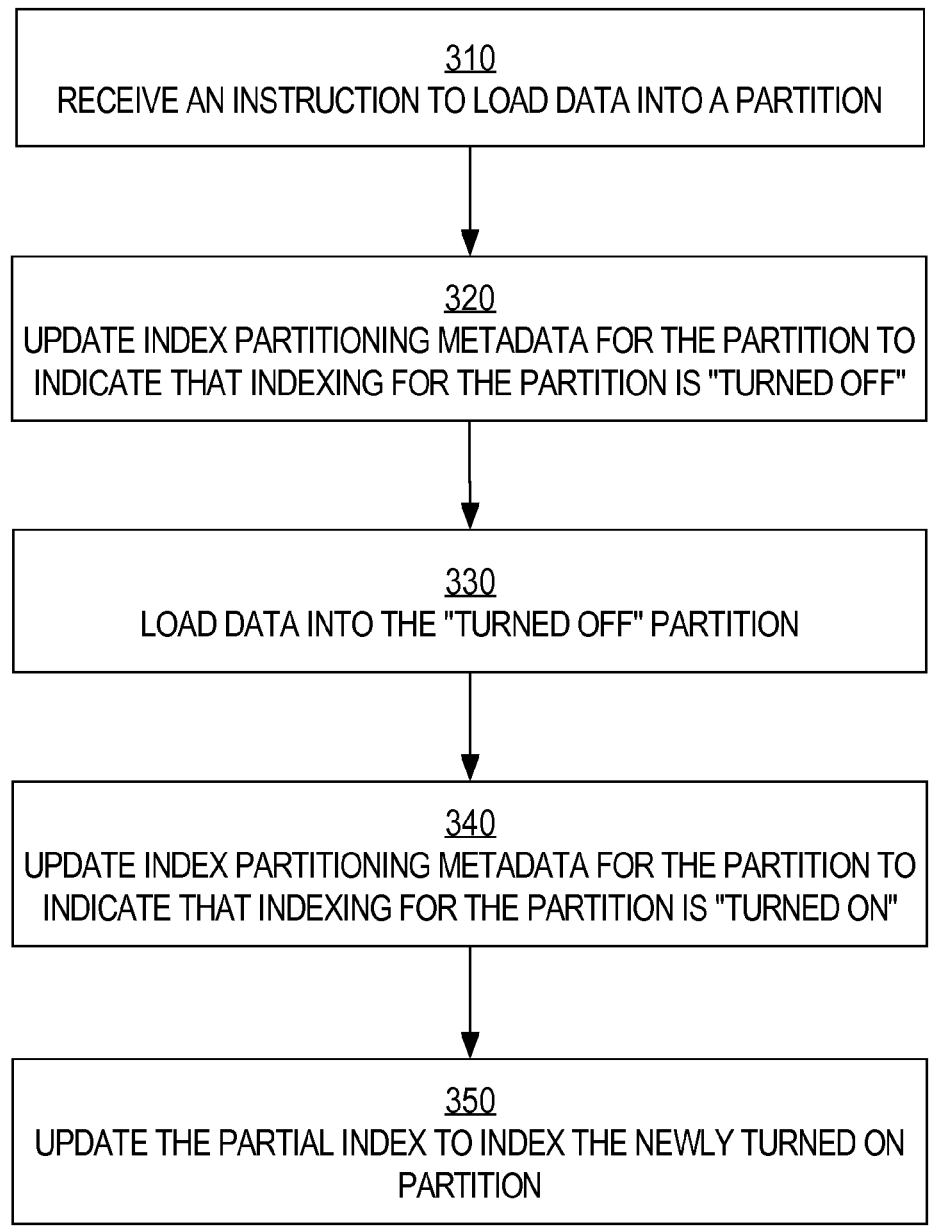
FIG. 3 is a flow diagram that depicts a process for loading data into a partition where indexing is turned off, in an embodiment.

One situation in which a partial index may be useful is when loading data into a partition. FIG. 3 is a flow diagram that depicts a process 300 for loading data into a partition where indexing is turned off to optimize the load process, in an embodiment. Index maintenance may be avoided during the load process.

At block 310, a load instruction to load data into a partition is received. The source of the data may vary from one implementation to another. Examples of sources of data may be an external load program loading a text file, a CSV (or Comma Separated Values) file, or another table or partition. An example of a load instruction is the following:

load data
    infile 'c:\data\mydata.csv'
    into table emp
    fields terminated by "," optionally enclosed by " "
    (empno, empname, sal, deptno)

While the above instruction is an example of an external load instruction, the load instruction may alternatively be an internal load instruction where the data is loaded from within the same database. An example SQL construct of such a load instruction is the INSERT AS SELECT statement.

At block 320, in response to receiving the load instruction, index partitioning metadata for the partition indicates that indexing for the partition is "turned off." As a result, all partial indexes do not have to be maintained as part of the load process. However, the freshly loaded table partition will be indexed after block 330 completes.

Alternatively, if indexing was not already turned off for the partition being loaded, an instruction to update the IPM to indicate that indexing is turned off for the partition is received prior to the load instruction received in block 310.

At block 330, data is loaded into the "turned off" partition. Block 330 may be performed while the partial index is accessible and valid with respect to other "turned on" partitions. If a query execution engine uses the partial index when executing an execution plan for a query, then the query execution engine uses the partial index to generate a result of processing the query for all indexed partitions, but not for the partition that is being loaded. Data for the partition that is being loaded is retrieved through a scan of the partition. Any newly loaded data is ignored as long as the transaction in which the load instruction is being executed has not committed.

At block 340, after the data is loaded into the partition, the index partitioning metadata may be updated to indicate that the "turned off" partition is now turned on with respect to indexing by the partial index.

At block 350, the partial index is updated to index the newly "turned on" partition. If the partial index is a global index, then updating the partial index involves incremental maintenance. If the partial index is a local index, then updating the partial index involves rebuilding the index partition. Although block 350 is depicted as occurring after block 340, block 350 may occur before block 340. Both block 340 and block 350 may be performed in the same transaction to ensure that a process that is accessing the index either "sees" (a) the table partition as indexing turned off and not reflected in the partial indexes or (b) the partition as turned on and reflected in the partial indexes. A situation where a process that is accessing the index "sees" (c) the partition as turned on and not reflected in the partial index or (d) the partition as turned off and reflected in the partial index may cause errors or sub-optimal performance.

Use Case: Legacy Data

Another use case for partial indexes involves legacy data that is rarely written to or read from. Such legacy data is stored in separate table partitions, which may be a very large data volume. However, a typical full index would still index that partition. In some databases, the total size of the indexes for a table is orders of magnitude greater than the table itself, mainly because multiple (e.g., ten) indexes are defined for the same table. Thus, embodiments allow only new, recent, or important partitions to be indexed.

Exchange Partition

One instruction swaps (or exchanges) the definition of a named partition of a partitioned table with the definition of a second standalone table. As a result of processing the instruction, the standalone table replaces the partition and becomes part of the partitioned table; the named partition becomes the standalone table, is excluded from the partitioned table, and may be dropped. An example of this instruction is the EXCHANGE PARTITION instruction, where the syntax is:
    ALTER TABLE <table_name>
    EXCHANGE PARTITION <partition_name>
    WITH TABLE <new_table_name>

In an embodiment, when processing this instruction, the metadata of the partition that is to be exchanged with the "outer" table may be updated to indicate that indexing is turned off. Then the "outer" table replaces the partition in the partitioned table and no index maintenance for partial indexes has to be done. After this instruction, the metadata for the exchanged partition can be updated to indicate that indexing is turned on and the exchanged partition will be indexed. The two instructions to update the metadata may be generated and submitted automatically or manually.

Table Expansion

In an embodiment, a partial index is considered during compilation of a query or statement that indicates (e.g., identifies) a particular table upon which the partial index is based. A query processor determines whether the partial index may be used to answer the query. If so, then the query processor (or an execution plan generator) generates an execution plan that includes use of the partial index. The query processor also identifies one or more partitions that are not indexed by the partial index and causes the execution plan to include a scan operation that targets the one or more unindexed partitions. Thus, the execution plan contains two "branches": one branch for the partial index and another branch for the scan of the unindexed partitions. The results of executing each branch are combined (e.g., through a UNION ALL) to generate a result for the query.

Automatic Turn On/Turn Off

In an embodiment, a full index is automatically converted into a partial index in response to one or more criteria (other than an explicit instruction or database statement) being satisfied. Such criteria may include a partition not being read from and/or written to in a certain period of time or other measurement, such as a number of transactions involving a particular partition over a period of time. For example, if a partition has not been read from in two weeks, then index partitioning metadata for the partition is updated to indicate that indexing for the partition is turned off. As another example, if a partition has not be accessed by two million consecutive transactions or database statements, then index partitioning metadata for the partition is updated to indicate that indexing for the partition is turned off.

Conversely, in an embodiment, index partitioning metadata is turned on automatically in response to one or more criteria (other than an explicit instruction) being satisfied. For example, if a "turned off" partition is being repeatedly scanned while the corresponding partial index is being used for the same queries (e.g., ten times in two days), then the partition is turned on so that the index will index data from the partition.

Index-Specific Switch

In some cases, multiple indexes (whether local or global) index a partitioned table. In an embodiment, one or more of the indexes are partial indexes and some others of the indexes are "full" indexes. Thus, an instruction to turn indexing on or off for one partition of a partitioned table may affect all or only some indexes that index the partitioned table. Full indexes are not affected by such an instruction, unless a full index is changed to become a partial index that is capable of indexing a strict subset of the partitions of a partitioned table.

In an embodiment, user input may identify a particular index and a particular partition for which indexing is turned off with respect to that particular index. For example, a database statement may be the following:
    ALTER INDEX orders_name MODIFY TABLE PARTITION ord_p2 INDEXING OFF;

In response to receiving such a statement, a database server may store metadata on an index basis, where the metadata indicates that indexing for table partition 'ord_p2' is turned off with respect to index 'orders_name.' Afterward, index 'orders_name' becomes a partial index, if it was a full index to begin with. However, table partition 'ord_p2' may remain turned on with respect to one or more other indexes.

In a related embodiment, user input identifies a particular index and a particular table partition for which indexing is turned on with respect to that particular index. For example, a database statement may be the following:
    ALTER INDEX orders_date MODIFY TABLE PARTITION ord_p4 INDEXING ON;

In response to receiving such a statement, a database server may store metadata on an index basis, where the metadata indicates that indexing for table partition 'ord_p4' is turned on with respect to index 'orders_name.' Afterward, index 'orders_name' may become equivalent to a full index, if all existing partitions are now indexed. Alternatively, index 'orders_name' may remain a partial index if there are one or more other partitions that remain turned off. Also, partition 'ord_p4' may remain turned off with respect to one or more other partial indexes.

In an embodiment, user input may identify a particular index and a particular partition for which indexing is turned off for all indexes except for the particular index. For example, a database statement may be the following:
    MODIFY PARTITION ord_p5 INDEXING OFF EXCEPT FOR INDEX orders_name;

In response to receiving such a statement, metadata is stored that indicates that indexing for partition 'ord_p5' is turned off for all partial indexes except for index 'orders_name'. As a result of processing this statement, all other partial indexes will remove all index entries for partition 'ord_p5' at the time of receipt of this statement.

In a related embodiment, user input may identify a particular partial index and a particular partition for which indexing is turned on for all partial indexes except for the particular partial index. For example, a database statement may be the following:
    MODIFY PARTITION ord_p6 INDEXING ON EXCEPT FOR INDEX orders_date;

In response to receiving such a statement, metadata is stored that indicates that indexing for table partition 'ord_p6' is turned on for all partial indexes except for index 'orders_date'. As a result of processing this statement, one or more of the other partial indexes will index partition 'ord_p6' and may be covering all data equivalent to full indexes if table partition 'ord_p6' was the only partition that was not indexed by the one or more other partial indexes.

While the above example statements only refer to one index, embodiments allow for the specification of multiple indexes in the same instruction. For example, instead of submitting the following two database statements to turn indexing off for partition 'ord_p2':

ALTER INDEX orders_name MODIFY PARTITION ord_p2 INDEXING OFF;
ALTER INDEX orders_date MODIFY PARTITION ord_p2 INDEXING OFF;

a single database statement may be:

ALTER INDEXES orders_name, orders_date MODIFY PARTITION ord_p2 INDEXING OFF;

Similarly, instead of the submitting the following two database statements to turn indexing on for partition 'ord_p6':

MODIFY PARTITION ord_p6 INDEXING ON EXCEPT FOR INDEX orders_name;
MODIFY PARTITION ord_p6 INDEXING ON EXCEPT FOR INDEX orders_date a single database statement may be:
MODIFY PARTITION ord_p6 INDEXING ON EXCEPT FOR INDEXES orders_name, orders_date;

In this way, multiple instructions do not need to be created and submitted in order to turn off or on a partition for multiple indexes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
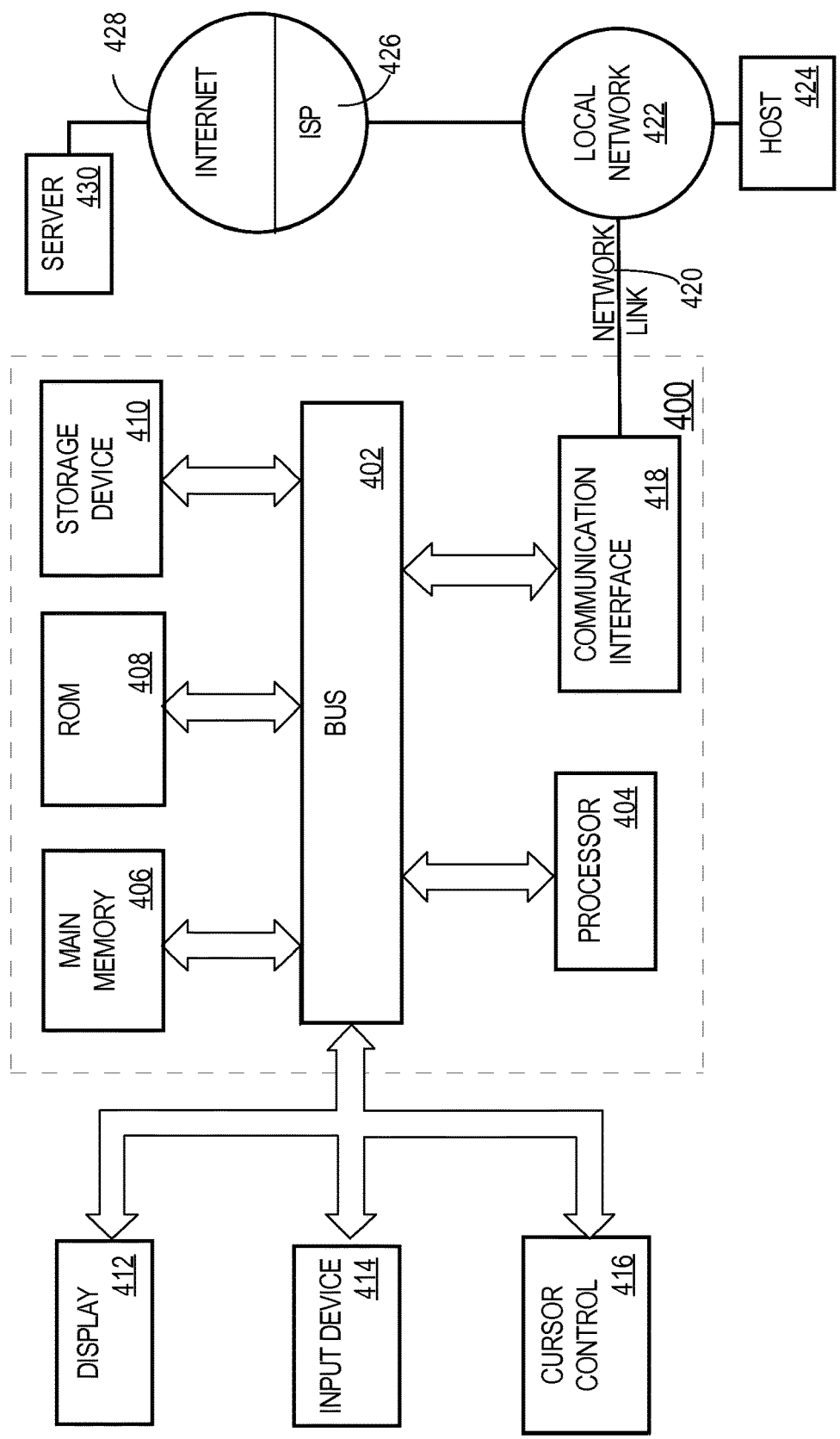
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for reducing an amount of storage required for storing an index, the method comprising:
  receiving an instruction to create a table;
  wherein the instruction indicates how the table is to be partitioned;
  storing a plurality of partitions of the table;
  storing the index that indexes data from multiple first partitions of the plurality of partitions and not from one or more second partitions of the plurality of partitions;
  wherein the instruction includes index partitioning metadata;
  storing the index partitioning metadata that identifies:
    the multiple first partitions as being indexed by the index, and
    the one or more second partitions as not being indexed by the index;
  wherein storing the index partitioning metadata is based on the instruction;
  receiving a query that involves the table;
  determining to use the index to process the query;
  wherein the method is performed by one or more computing devices.

2. The method of claim 1, further comprising:
  in response to receiving the query, for each entry of multiple entries of the index, determining whether said each entry corresponds to one of the one or more second partitions of the plurality of partitions.

3. The method of claim 2, further comprising:
  determining that a particular entry of said multiple entries corresponds to a partition of the one or more second partitions;
  in response to determining that the particular entry corresponds to a partition of the one or more second partitions, filtering out said particular entry.

4. The method of claim 1, further comprising:
  generating, for the query, an execution plan that involves using the index to access one or more entries in the multiple first partitions and scanning the one or more second partitions of the plurality of partitions.

5. The method of claim 1, further comprising:
  receiving input that identifies a particular partition of the one or more second partitions of the plurality of partitions;
  in response to receiving the input:
    updating the index partitioning metadata to indicate that the particular partition is to be indexed by the index;
    updating the index to index the particular partition along with the multiple first partitions of the plurality of partitions.

6. The method of claim 1, wherein the index is a first index and the index partitioning metadata is first index partitioning metadata, the method further comprising:
  while storing the first index partitioning metadata, storing second index partitioning metadata that is different than the second index partitioning metadata and that identifies at least one of the one or more second partitions as being indexed by a second index that is different than the first index.

7. A method for reducing an amount of storage required for storing an index, the method comprising:
  storing a plurality of partitions of a table;
  storing the index that indexes data from one or more first partitions of the plurality of partitions and not from one or more second partitions of the plurality of partitions;
  storing index partitioning metadata that identifies:
    the one or more first partitions as being indexed by the index, and
    the one or more second partitions as not being indexed by the index;

receiving a query that involves the table;
determining to use the index to process the query;
wherein a prior version of the index indexed all partitions in the plurality of partitions;
wherein a prior version of the index partitioning metadata identified all partitions in the plurality of partitions as being indexed by the index;
wherein a current version of the index indexes only a strict subset of the plurality of partitions of the table.

8. The method of claim 7, further comprising:
while the prior version of the index, is stored, receiving input that identifies the one or more second partitions of the plurality of partitions;
in response to receiving the input, modifying the index partitioning metadata to indicate the one or more second partitions as not being indexed by the index.

9. The method of claim 8, wherein the input indicates a load instruction, further comprising:
in response to receiving the input, while the index partitioning metadata identifies the one or more second partitions as not being indexed by the index, causing loadable data that is indicated by the load instruction to be loaded into the one or more second partitions of the plurality of partitions;
after the loadable data is loaded into the one or more second partitions of the plurality of partitions, updating the index partitioning metadata to indicate that the one or more second partitions are to be indexed by the index.

10. The method of claim 9, further comprising:
while the loadable data is being loaded into the one or more second partitions of the plurality of partitions, determining to use the index to process a second query;
while processing the query, using the index to identify first data that satisfies one or more search criteria indicated in the query and scanning the one or more second partitions to identify second data that satisfies the one or more search criteria.

11. One or more non-transitory computer-readable media storing instructions for reducing an amount of storage required for storing an index, wherein the instructions, when executed by one or more processors, cause:
receiving an instruction to create a table;
wherein the instruction indicates how the table is to be partitioned;
storing a plurality of partitions of the table;
storing the index that indexes data from one or more first partitions of the plurality of partitions and not from one or more second partitions of the plurality of partitions;
wherein the instruction includes index partitioning metadata;
storing the index partitioning metadata that identifies:
the one or more first partitions as being indexed by the index, and
the one or more second partitions as not being indexed by the index;
wherein storing the index partitioning metadata is based on the instruction;
receiving a query that involves the table;
determining to use the index to process the query.

12. The one or more non-transitory computer-readable media of claim 11, wherein the instructions, when executed by the one or more processors, further cause:
in response to receiving the query, for each entry of multiple entries of the index, determining whether said each entry corresponds to one of the one or more second partitions of the plurality of partitions.

13. The one or more non-transitory computer-readable media of claim 12, wherein the instructions, when executed by the one or more processors, further cause:
determining that a particular entry of said multiple entries corresponds to a partition of the one or more second partitions;
in response to determining that the particular entry corresponds to a partition of the one or more second partitions, filtering out said particular entry.

14. The one or more non-transitory computer-readable media of claim 11, wherein the instructions, when executed by the one or more processors, further cause:
generating, for the query, an execution plan that involves using the index to access one or more entries in the one or more first partitions and scanning the one or more second partitions of the plurality of partitions.

15. The one or more non-transitory computer-readable media of claim 11, wherein the instructions, when executed by the one or more processors, further cause:
receiving input that identifies a particular partition of the one or more second partitions of the plurality of partitions;
in response to receiving the input:
updating the index partitioning metadata to indicate that the particular partition is to be indexed by the index;
updating the index to index the particular partition along with the one or more first partitions of the plurality of partitions.

16. The one or more non-transitory computer-readable media of claim 11, wherein the index is a first index and index partitioning metadata is first index partitioning metadata, wherein the instructions, when executed by the one or more processors, further cause:
while storing the first index partitioning metadata, storing second index partitioning metadata that is different than the second index partitioning metadata and that identifies at least one of the one or more second partitions as being indexed by a second index that is different than the first index.

17. One or more non-transitory computer-readable media storing instructions for reducing an amount of storage required for storing an index, wherein the instructions, when executed by one or more processors, cause:
storing a plurality of partitions of a table;
at a first point in time:
storing the index that indexes data from all partitions in the plurality of partitions of the table;
storing index partitioning metadata that identifies all the partitions in the plurality of partitions as being indexed by the index;
after the first point in time:
updating the index to index data from one or more first partitions of the plurality of partitions and not from one or more second partitions of the plurality of partitions;
updating the index partitioning metadata to identify the one or more second partitions as not being indexed by the index;
receiving a query that involves the table;
determining to use the index to process the query.

18. The one or more non-transitory computer-readable media of claim 17, wherein the instructions, when executed by the one or more processors, further cause:

prior to the updating the index or the updating the index partitioning metadata, receiving input that identifies the one or more second partitions of the plurality of partitions;

wherein updating the index partitioning metadata is performed in response to receiving the input.

19. The one or more non-transitory computer-readable media of claim 18, wherein the input indicates a load instruction, wherein the instructions, when executed by the one or more processors, further cause:

in response to receiving the input, while the index partitioning metadata identifies the one or more second partitions as not being indexed by the index, causing loadable data that is indicated by the load instruction to be loaded into the one or more second partitions of the plurality of partitions;

after the loadable data is loaded into the one or more second partitions of the plurality of partitions, updating the index partitioning metadata to indicate that the one or more second partitions are to be indexed by the index.

20. The one or more non-transitory computer-readable media of claim 19, wherein the instructions, when executed by the one or more processors, further cause:

while the loadable data is being loaded into the one or more second partitions of the plurality of partitions, determining to use the index to process the query;

while processing the query, using the index to identify first data that satisfies one or more search criteria indicated in the query and scanning the one or more second partitions to identify second data that satisfies the one or more search criteria.

* * * * *

UNITED STATES PATENT AND TRADEMARK OFFICE
CERTIFICATE OF CORRECTION

PATENT NO. : 10,282,437 B2
APPLICATION NO. : 14/255425
DATED : May 7, 2019
INVENTOR(S) : Raghavan et al.

It is certified that error appears in the above-identified patent and that said Letters Patent is hereby corrected as shown below:

In the Specification

In Column 3, Line 54, delete "'env'" and insert -- 'emp' --, therefor.

In Column 3, Line 56, delete "'env'" and insert -- 'emp' --, therefor.

In Column 3, Line 57, delete "'env'" and insert -- 'emp' --, therefor.

In the Claims

In Column 13, Line 11, in Claim 8, delete "index," and insert -- index --, therefor.

Signed and Sealed this
Twenty-eighth Day of July, 2020

Andrei Iancu
*Director of the United States Patent and Trademark Office*